Patented Oct. 10, 1922.

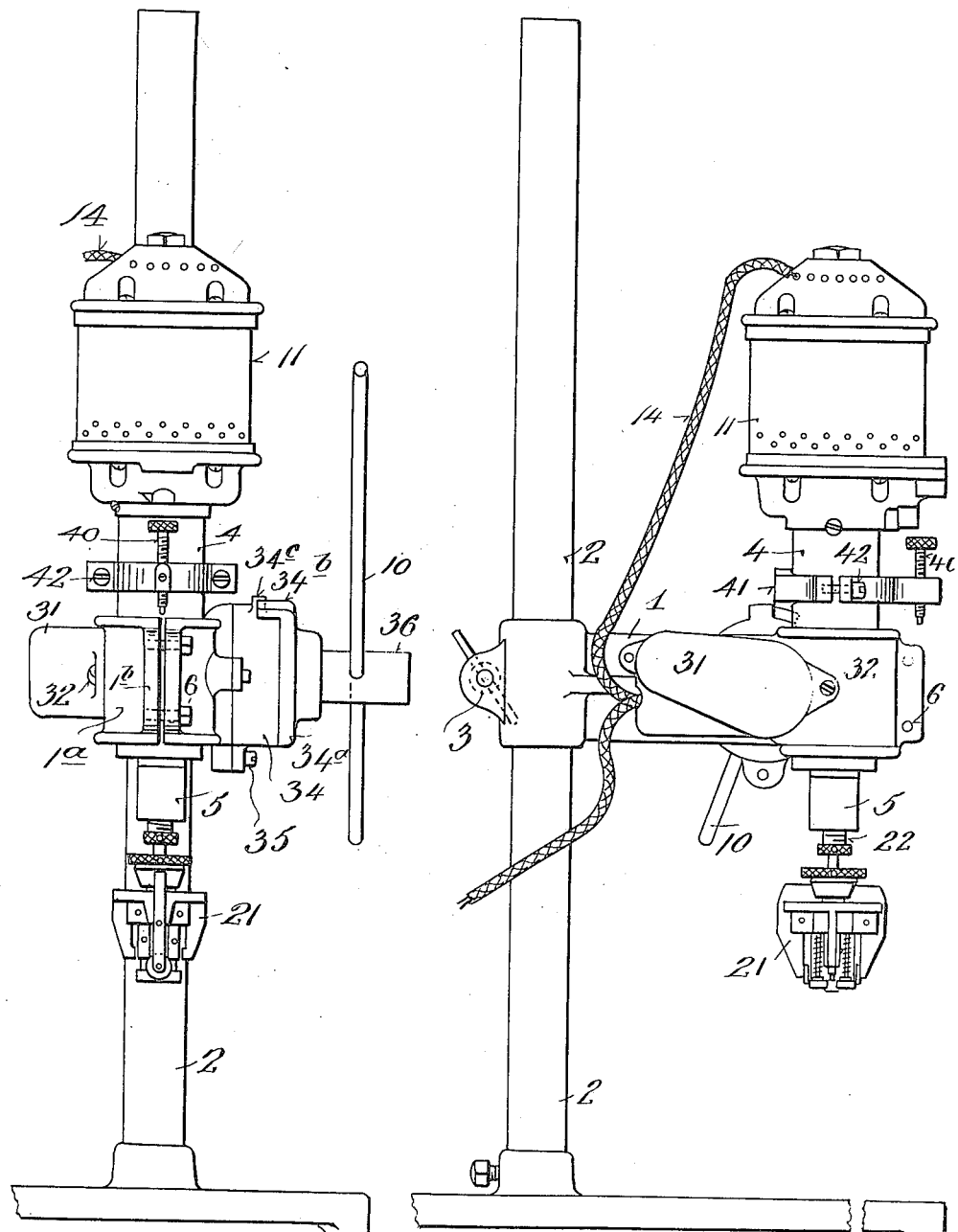

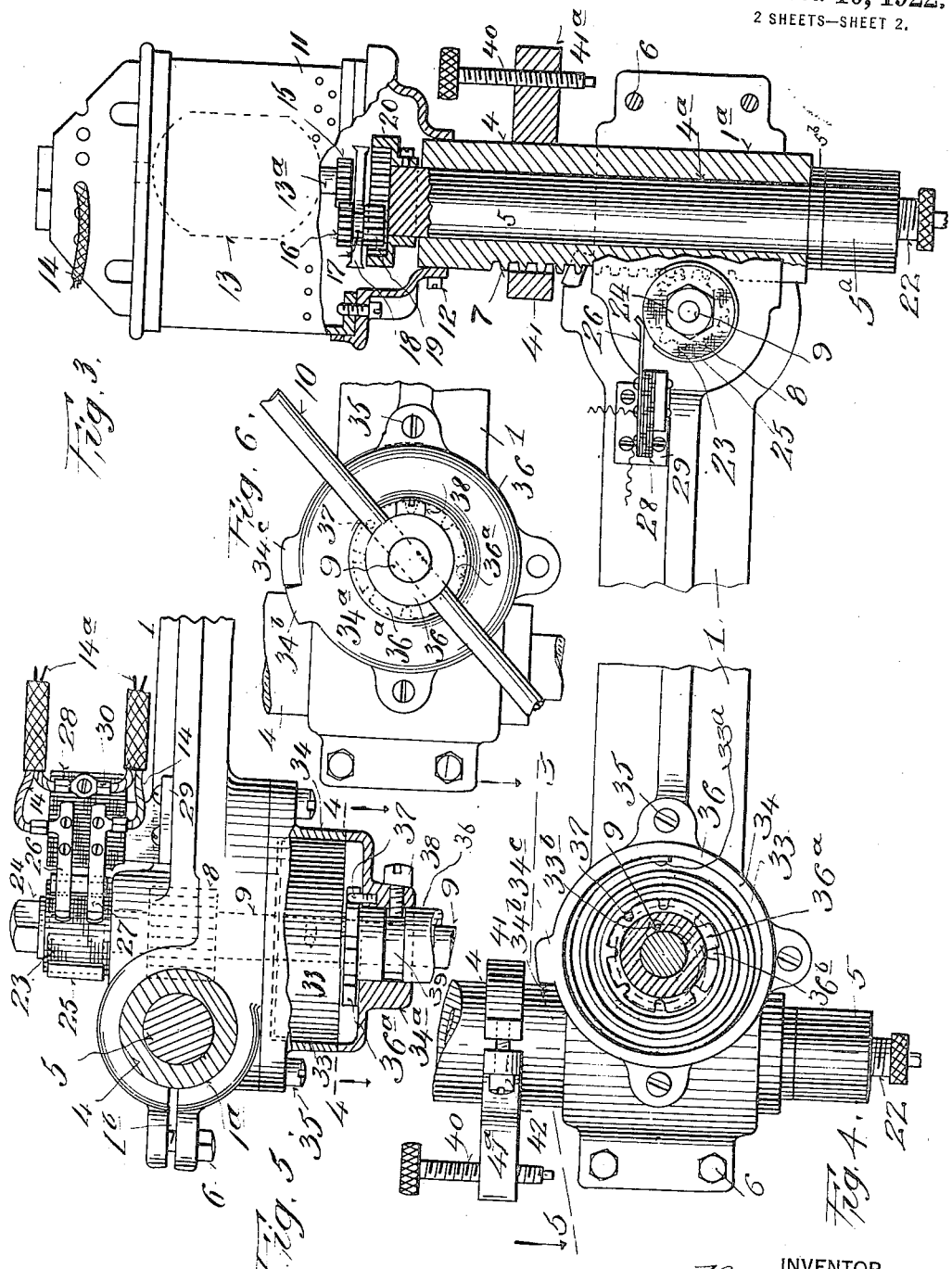

1,431,749

UNITED STATES PATENT OFFICE.

ISIDOR NEWMAN, OF NEW YORK, N. Y.

ELECTRIC MACHINE TOOL.

Application filed May 10, 1921. Serial No. 468,363.

*To all whom it may concern:*

Be it known that I, ISIDOR NEWMAN, a citizen of the United States, and resident of New York City, borough of Manhattan, in the county of New York and State of New York, have invented certain new and useful Improvements in Electric Machine Tools, of which the following is a specification.

My invention has for its object to provide a machine tool having a longitudinally movable drive spindle rotative by means of an electric motor, the circuit of which motor is open when the tool is not in use, with means to close said circuit when the spindle is advanced to the work and to break the circuit when the spindle is returned to the idle position.

A further object is to provide a spring to automatically return the spindle to the idle position, and retain it there, with means to permit adjustment of the tension of the spring as may be required.

My invention comprises novel details of improvement that will be more fully hereinafter stated and then pointed out in the claims.

Reference is to be had to the accompanying drawings forming part hereof, wherein—

Figure 1 is a side view of my improved machine tool; Fig. 2 is a front view thereof; Fig. 3 is an enlarged detail view partly in section; Fig. 4 is a side view, partly in section on line 4, 4 in Fig. 5; Fig. 5 is a plan view, partly in section on line 5, 5 in Fig. 4; Fig. 6 is a detail side view, looking from the right in Fig. 2.

Similar numerals of reference indicate corresponding parts in the several views.

A suitable frame 1 may be supported in any desired manner, as upon a standard 2, clamping means 3 on said frame securing it in any desired position on the standard. Frame 1 has a vertical bearing 1$^a$ slidably receiving a guiding sleeve 4 having a vertical bearing bore 4$^a$ within which is journaled a spindle 5. The bearing portion 1$^a$ is shown split at 1$^b$ and provided with screws 6 whereby the bearing may be adjusted to the sleeve 4, or the latter may be rigidly clamped in the bearing. Sleeve 4 may be raised and lowered, to feed the spindle, by means of rack teeth 7 on the sleeve engaging a pinion 8 on a shaft 9 journaled transversely in frame 1. A handle or bar 10 on shaft 9 permits ready rotation of the latter by the operator. Any suitable bearing may be provided to take the thrust of spindle 5 by bearing sleeve 4. I have shown the lower end of spindle 5 enlarged at 5$^a$ to bear against washer 5$^b$ at the lower end of sleeve 4. Sleeve 4 at its upper end carries a housing 11 which may be detachably secured by screws 12. Within housing 11 an electric motor 13 is supported, the conductor wires or cable 14 for the motor circuit entering the housing through suitable openings. The motor drive shaft 13$^a$ is provided with a gear 15 to drive the spindle 5. I have shown gear 15 in mesh with a gear 16 on a shaft 17 journaled on a support 18 secured in housing 11 (Fig. 3). Shaft 17 has a gear 19 in mesh with an internal gear 20 secured at the upper end of spindle 5 above sleeve 4 within housing 11. The housing, motor and gearing rise and descend with sleeve 4 and spindle 5 when actuated by gear 8. The lower end of spindle 5 is adapted for connection with any suitable tool, such as a drill, or a can capping tool indicated at 21. A detachable shank 22, threaded to connect with spindle 5, connects tool 21 thereto. The spindle may carry a clutch for a drill or other tool in a well known manner.

The circuit for the motor is controlled with the up and down movement of spindle 5. Secured upon shaft 9 is a circular insulating block 23, which may be detachably secured by nut or screw 24. Upon insulation 23 is secured a metal contact 25, having its ends suitably spaced apart (Figs. 3 and 5). Contacts 26, 27 are adapted to engage insulation 23 and contact 25. Contacts 26, 27 are supported by insulation 28, secured upon bracket 29, attached to frame 1. Conductors 14 for the motor terminals connect with contacts 26, 27, and a contact 30 on insulation 28 connects with the conductors 14$^a$, (Fig. 5). When spindle 5 is raised in the normal or idle position the contacts 26, 27 will rest on insulation 23, and the motor circuit will be broken. When sleeve 4 and spindle 5 are advanced to the work or lowered a suitable distance by rotation of shaft 9 the insulation 23 and contact 25 will be rotated to engage contact 25 with contacts 26, 27 and the motor circuit will be closed. Said circuit will remain closed while the tool is in use. When the spindle is returned nearly to the idle or normal position the contact 25 will pass from the contacts 26, 27, and will rest on insulation 23, and the motor circuit will be broken.

The insulation 23, 28, and the aforesaid contacts may be protected by a cover 31, detachably secured thereover by screws 32, on frame 1, (Fig. 1).

In order to retain the spindle 5 in the normal or idle position, and return the spindle thereto if released, I provide a spring 33, preferably like a clock spring, shown within a barrel or drum 34 secured on frame 1 by screws 35, on the side opposite the aforesaid insulation and contacts, (Figs. 4 and 5). Spring 33 is secured at one end 33ᵃ to barrel 34 and at the other end 33ᵇ to shaft 9. A sleeve 36 on shaft 9 is provided with a flange 36ᵃ having spaced notches 36ᵇ, (Fig. 4). A cover member 34ᵃ, loose on sleeve 36, fits over the outer end of barrel 34, and is provided with an internal pin or projection 37 to fit in either of the notches 36ᵇ of flange 36ᵃ. Cover 34ᵃ has a projection 34ᵇ to engage a stop 34ᶜ on barrel 34. Cover 34ᵃ has a screw 38 (Fig. 5) to fit in a groove 39 in sleeve 36, to retain the cover in position, the shaft 9 and sleeve 36 being rotative within said cover. Bar 10 passes through sleeve 36 to lock it to shaft 9. The tension of spring 33 may be regulated by holding shaft 9, withdrawing screw 38, sliding cover 34ᵃ along the shaft to release pin 37 from a notch 36ᵇ of flange 36ᵃ, rotating the cover or the shaft, the required amount, entering the pin in a desired notch 36ᵃ, restoring screw 38 in groove 39, and allowing projection 34ᵇ to engage stop 34ᶜ to retain flange 36ᵃ with spring 33 under the desired tension.

An adjustable stop 40, shown in the form of a screw, is carried by the projecting portion 41ᵃ of a collar 41. The collar 41 is shown of the split variety retained clamped upon sleeve 4 by screws 42. The collar as well as screw 40 may be adjusted along sleeve 4, the screw 40 being adapted to engage the frame 1 to limit the feed of spindle 5 to the work. The collar and stop may be removed to permit the spindle to have additional feeding movement.

My improved tool will be found of utility for various purposes, since the feed of the spindle 5 to and from the work controls the operation of the motor, effecting a saving in electric current, the return of the spindle from the work each time cutting off the current which will not flow until the spindle is advanced a suitable distance to the work. In case the operator releases shaft 9, when the spindle is advanced, the spring 33 will automatically return the spindle to idle position by operating shaft 9, gear 8 and sleeve 4, thereby causing contact 25 to break the motor circuit at 26, 27, reducing danger from careless operation of the tool.

Changes may be made in the details of construction set forth, within the scope of the appended claims, without departing from the spirit of my invention.

Having now described my invention, what I claim is:

1. The combination of a standard, a frame supported by and extending from the standard, a sleeve slidably carried by the frame, means supported by the frame to reciprocate the sleeve, a spindle rotative in the sleeve, a motor supported by the sleeve, and connecting means between the motor and the spindle for rotating the latter by the former.

2. The combination of a standard, a frame supported by and extending from the standard, a sleeve slidably carried by the frame, means supported by the frame to reciprocate the sleeve, a spindle rotative in the sleeve, a motor supported by the sleeve, and gearing between the motor drive shaft supported by said sleeve for rotating the spindle by the motor.

3. The combination of a standard, a frame supported by and extending from the standard, a sleeve slidably carried by the frame, means supported by the frame to reciprocate the sleeve, a spindle rotative in the sleeve, a motor supported by the sleeve, a gear upon the spindle above the sleeve, a gear upon the motor shaft, and gearing supported by the sleeve in mesh with the first named gears for rotating the spindle by the motor.

4. The combination of a standard, a frame supported by and extending from the standard, a sleeve slidably carried by the frame, and provided with a rack, a shaft carried by the frame and having a gear in mesh with the rack to reciprocate the sleeve, a spindle rotative in the sleeve, a housing supported on the sleeve, a motor supported within the housing and having a gear, a gear upon the spindle within the housing, and gearing carried by the housing in mesh with said gears.

5. The combination of a frame, a sleeve slidably carried by the frame and provided with a rack, a spindle rotative within the sleeve, a motor and gearing supported by the sleeve to rotate the spindle, a shaft having a gear in mesh with said rack, and circuit controlling means controlled with said shaft to open and close the motor circuit.

6. The combination of a frame, a spindle carried thereby for rotary and longitudinal motion, a motor and driving connection therefrom to the spindle, a shaft, gearing controlled by the shaft to move the spindle longitudinally, a circuit for the motor, contacts for the circuit, insulation carried by the shaft, and a contact carried by said insulation to engage the first named contacts when the spindle is advanced to the work, said contacts being out of engagement when the spindle is retracted.

7. The combination of a frame, a spindle, means slidably and rotatively supporting the spindle on the frame, a shaft journaled on the frame, a spring connected to the shaft and to the frame to rotate the shaft, and means to adjust the tension of the spring, and stop means to limit rotation of the shaft by the spring.

8. The combination of a frame, a spindle, means slidably and rotatively supporting the spindle on the frame, a shaft journaled on the frame, a spring connected to the shaft and to the frame to rotate the shaft, the shaft carrying a flange having recesses, a member loose on the shaft and having a projection to engage said recesses, and stop means between said member and the frame to control the position of said member.

9. The combination of a frame, a spindle, means slidably and rotatively supporting the spindle on the frame, a shaft journaled on the frame, a barrel on the frame, a spring within the barrel secured to the latter and to the shaft, a recessed flange carried by the shaft, a member over the housing having a projection to engage said recesses, a projection on said member and a cooperative stop on the housing, and means to retain said member in position on the housing.

Signed at New York City, in the county of New York, and State of New York, this 9th day of May, A.D. 1921.

ISIDOR NEWMAN.